United States Patent
Murphy

(10) Patent No.: US 7,414,573 B2
(45) Date of Patent: *Aug. 19, 2008

(54) METHOD AND APPARATUS FOR PROVIDING AN INTEGRATED COMMUNICATIONS, NAVIGATION AND SURVEILLANCE SATELLITE SYSTEM

(75) Inventor: Timothy A Murphy, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/205,917

(22) Filed: Aug. 17, 2005

(65) Prior Publication Data

US 2007/0241957 A1   Oct. 18, 2007

Related U.S. Application Data

(60) Division of application No. 10/738,314, filed on Dec. 17, 2003, now Pat. No. 6,963,304, which is a continuation of application No. 09/972,355, filed on Oct. 5, 2001, now Pat. No. 6,674,398.

(51) Int. Cl.
   *G01S 5/14* (2006.01)
(52) U.S. Cl. ................................. 342/357.02
(58) Field of Classification Search ............ 342/357.01, 342/357.02
   See application file for complete search history.

(56) References Cited

U.S. PATENT DOCUMENTS

| | | | |
|---|---|---|---|
| 4,359,733 A | 11/1982 | O'Neill | |
| 4,652,884 A | 3/1987 | Starker | |
| 4,751,512 A * | 6/1988 | Longaker | 342/357.03 |
| 5,006,855 A | 4/1991 | Braff | |
| 5,099,245 A | 3/1992 | Sagey | |
| 5,323,322 A * | 6/1994 | Mueller et al. | 701/215 |
| 5,365,447 A | 11/1994 | Dennis | |
| 5,381,140 A | 1/1995 | Kuroda et al. | |
| 5,467,282 A | 11/1995 | Dennis | |
| 5,619,211 A * | 4/1997 | Horkin et al. | 342/357.17 |
| 5,621,646 A * | 4/1997 | Enge et al. | 701/120 |
| 5,627,546 A * | 5/1997 | Crow | 342/352 |
| 5,969,674 A | 10/1999 | Von der Embse et al. | |
| 6,044,323 A | 3/2000 | Yee et al. | |
| 6,138,074 A * | 10/2000 | Gower et al. | 701/215 |
| 6,182,927 B1 * | 2/2001 | Galvin | 244/158.4 |
| 6,567,041 B1 * | 5/2003 | O'Dell | 342/357.03 |
| 6,674,398 B2 * | 1/2004 | Murphy | 342/357.01 |

OTHER PUBLICATIONS

"Presentation Galileo du Sep. 26, 2000."*

(Continued)

*Primary Examiner*—Gregory C Issing
(74) *Attorney, Agent, or Firm*—Harness, Dickey & Pierce, P.L.C.

(57) ABSTRACT

A system provides integrated communications, navigation and surveillance capabilities. A plurality of satellites broadcast multiple navigation signals and is capable of two-way communication. At least one monitoring station is capable of receiving the navigation signals broadcast by the satellites and of determining its position based upon the received navigation signals. The monitoring station communicates its computed position to a processing apparatus so that an integrity of the system can be ascertained.

15 Claims, 3 Drawing Sheets

OTHER PUBLICATIONS

Kinal, G. et al, "INMARSAT Integrity Channels for Global Navigation Satellite Systems," IEEE AES Magazine, Aug. 1992, pp. 22-25.*

Batchelor, A. et al IEE Satellite Systems for Mobile Communications and Navigation May 1996, pp. 1-6.*

Galati, G. et al, "Study of an Integrated Communication, Navigation and Surveillance Satellite System for Air Traffic Management,"Oct. 1996, pp. 238-241.*

Galati, G. et al., "Study of an Integrated Communication, Navigation and Surveillance Satellite System for Air Traffic Management", Proc. of the CIE International Conf. of Radar, Oct. 1996, pp. 238-241.

Galati, G. et al., Global Navigation Satellite System in an Integrated Air Traffic Management Constellation, IEE Proc.-Radar, Sonar Navigation, vol. 144, No. 3, Jun. 1997.

ION GPS 1998, Kline, P., Murphy, T., Van Dyke, K. "LAAS Availability Assessment: The Effects of Augmentations and Critical Satellites on Service Availability", Sep. 1998, Nashville, TN.

ION GPS 1999, Dai, D., Walter. T., Enge, P. Powell, J.D. "Satellite-Based Augmentation System Signal-In-Space Integrity Performance Analysis, Experience, and Perspectives", Sep. 1999, Nashville, TN.

ION GPS 1999, Edgar, C., Czopek, F., Barker, B. "A Co-operative Anomaly Resolution on PRN-19", Sep. 1999, Nashville TN.

ION GPS 1999, Tran, P., Wu, J.-S., Lewellen, J., Angus, J. "The Sensitivity of Category I Precision Approach Availability to GPS Satellite Constellation", Sep. 1999, Nashville, TN.

ION GPS 2000, MacAbiau, C., Chatre, E. "Signal Quality Monitoring for Protection of GBAS Users Against Evil Waveforms", Sep. 2000, Salt Lake City, UT.

ION GPS 2000, Mallett, I., Van Dyke, K. "GPS Availability for Aviation Applications: How Good Does it Need to Be?", Sep. 2000, Salt Lake City, UT.

ION GPS 2000, Phelts, R.E., Akos, D.M., Enge, P. "Robust Signal Quality Monitoring and Detection of Evil Waveforms", Sep. 2000, Salt Lake City, UT.

ION GPS 2001, McGraw, G., Murphy, T. "Safety of Life Considerations for GPS Modernization Architectures", Sep. 2001, Salt Lake City, UT.

RTCA SC-159 WG6 GNSS Interference Working Group "Assessment of Radio Frequency Interference Relevant to the GNSS", Jul. 31, 1996.

U.S. Department of Transportation (DOT-VNTSC-RSPA-98-1) and U.S. Department of Defense (DOD-4650.5), "1999 Federal Radionavigation Plan", Feb. 2000.

IEE Colloquim on Remote Sensing of the Propagation Envinronment, Batchelor et al., "Ionospheric Delay Estimation in the European Global Navigation Overlay Service" XP002221420, pp. 3/1-3/6, Nov. 19, 1996, London, UK.

Position Location and Navigation Symposium, IEEE, Crow, R.P., "Federal Radionavigation Plan-Pie in the Sky for Civil Aviation?" pp. 115-122, Apr. 20-23, 1998, Palm Springs, CA USA.

* cited by examiner

METHOD AND APPARATUS FOR PROVIDING AN INTEGRATED COMMUNICATIONS, NAVIGATION AND SURVEILLANCE SATELLITE SYSTEM

CROSS-REFERENCE TO RELATED APPLICATIONS

This application is a divisional of U.S. patent application Ser. No. 10/738,314 filed on Dec. 17, 2003 and now issued as U.S. Pat. No. 6,963,304, which is a continuation of U.S. patent application Ser. No. 09/972,355 filed on Oct. 5, 2001, and now issued as U.S. Pat. No. 6,674,398, the disclosures of which are incorporated herein by reference.

FIELD OF THE INVENTION

The present invention relates to a global integrated communications, navigation and surveillance satellite system.

BACKGROUND OF THE INVENTION

Current satellite systems provide positioning and time information by broadcasting navigation signals to properly equipped users. For example, a the US Global Positioning System (GPS) consists of 24 satellites orbiting the earth twice a day at an altitude of approximately twelve thousand miles, as well as a network of ground stations to monitor and manage the satellite constellation. The GPS satellites transmit continuous Navigation Data and Ranging (NDR) information 24 hours a day toward the earth. A GPS receiver which properly decodes, tracks and interprets these transmissions from the GPS satellites can compute the position of the GPS receiver as well as determine accurate time. The basic functioning of GPS and GPS receivers, is well known in the art. The GPS satellite system currently broadcasts for civilian use a Standard Positioning Service (SPS) on a single frequency (1575.42 MHz) called L1. The current GPS receivers and the GPS satellites are not capable of two-way communication with each other. GPS is a broadcast only service.

The GPS was conceived, designed and deployed as a military force enhancement. Consequently much of the capability of the GPS (i.e. the Precise Positioning Service or PPS) is not available to Civil users. Furthermore, even the GPS SPS service which is available to the civil community was not designed with adequate integrity, reliability or availability necessary to support safety of life civil applications. Furthermore, the SPS includes a relatively low power signal on only a single frequency and is consequently vulnerable to intentional or unintentional interference. These problems with the integrity and robustness of the civil GPS services are well known in the art.

As the SPS signals travel from the GPS satellites to the GPS receivers the SPS signals travel through the ionosphere which encircles the earth. The ionosphere acts as a dispersive medium and refracts the SPS signals as they travel through the ionosphere. As a result, the SPS signals do not appear to travel at the speed of light, which is assumed in the calculation of the position of the GPS receiver. The ionospheric induced delay in the reception of the SPS signals limits the accuracy of the determination of the position of the GPS receiver and is the largest location dependent error source in the calculation of the position of the GPS receiver. Therefore, the use of the GPS SPS signals to compute a position of the GPS receiver has limited accuracy and cannot be used for applications requiring a high degree of precision in the determination of the position of the GPS receiver.

To overcome the aforementioned shortcomings of the GPS, a number of space based augmentation systems (SBAS) are under development. For example, there are currently three SBAS systems under development world-wide: the Wide Area Augmentation System (WAAS) under development by the Federal Aviation Administration; the European Geostationary Navigation Overlay Service (EGNOS) under development by the European Space Agency in conjunction with EURO CONTROL and the European Union; and the MTSAT Satellite Augmentation System (MSAS) under development by the Japanese Civil Aviation Bureau. These SBASs provide for a way to measure and correct for the ionospheric delay caused by the SPS signals traveling through the ionosphere on its way toward earth and provide for basic integrity monitoring of the GPS SPS service sufficient to meet the requirements for civil aviation applications. However, all these SBAS will operate on the same GPS L1 frequency and will ultimately depend on the availability of basic GPS SPS. Hence SBAS does little or nothing to address the robustness concerns of GPS.

The electron density of the ionosphere varies as a function of geographic location. In a vectorized, wide area differential solution such as that employed by an SBAS, a large number of sampling locations are needed to compute an accurate model of the variation of the time delay induced in a signal traveling through various locations in the ionosphere. Therefore, in order to get adequate sampling of the state of the ionosphere, the SBASs employ a number of reference stations over a wide region that are fixed to the earth. These reference stations are connected via a ground based telecommunications network to a central processing facility. Each reference station observes the transmitted SPS signals from the GPS satellites visible at the reference station, performs some signal integrity monitoring, and passes the data on to the central processing facility via the ground based telecommunications network. These stations also track a component of the PPS using a codeless tracking technique in order to make dual frequency measurements of the ionosphere. The central processing facility uses the data from the reference stations to compute "wide-area" differential corrections where separate corrections are given for various satellite pseudo range error components. The SBASs then provide estimates of the vertical ionospheric delay at predefined grid points over the region covered by the SBAS to users of the SBAS. The estimates are broadcast from the SBAS to the user via a satellite link which is designed to be very similar to a GPS signal. The GPS receiver can then compute an estimate of the ionospheric delay for each pseudo range based on the user's location and the geometry of the satellites and compute its position more accurately by accounting for the ionospheric delay in the SPS signals and by applying the other differential correction components included in the SBAS signal.

The SBAS architecture is attractive in that it supports operations over a wide area and may even be capable of providing a level of service sufficient to support category 1 precision approach aircraft operations. However, the complexity and cost of such a system makes it impractical for most States or regions to consider employing such a system. Particularly, the cost of the ground based telecommunications network can be very significant. Also, in order to get good sampling of the ionosphere and a more accurate grid of-the errors introduced by the ionosphere, a large number of reference stations are required, which in turn increases the cost of connecting all the reference stations with the ground based telecommunication networks.

Therefore, it is desirable to develop a system and method for accurately measuring and correcting the time delay induced in signals traveling through the ionosphere. Additionally, it is desirable to perform the ionospheric delay sampling without the need for an extensive network of ground based monitoring stations. It is also desirable to provide monitoring stations without the need for the monitoring stations to be connected to the central processing facility by expensive ground based telecommunication networks.

SUMMARY OF THE INVENTION

The present invention is directed to a method and apparatus for providing a global communication, navigation and surveillance (GCNS) system that overcomes the shortcomings of the GPS without the need for an extensive SBAS. Additionally, the present invention provides for an entirely new class of capabilities heretofore unavailable with either the GPS or SBAS.

In one preferred embodiment, the GCNS system of the present invention makes use of a plurality of time synchronized satellites. Each satellite broadcasts multiple navigation signals, can engage in two-way communications, and can receive and relay surveillance signals. Each satellite of the plurality of satellites is part of a network that allows each satellite of the plurality of satellites to communicate with any other satellite of the plurality of satellites. There is a terrestrial segment that has a processing apparatus that is capable of two way communication with any satellite of the plurality of satellites through the network. There is also at least one mobile user device that is capable of two-way communication with the plurality of satellites. The at least one user device can directly communicate with each satellite of the plurality of satellites that are within a line of sight of the user device and with the remaining satellites through the network. The at least one user device is also capable of receiving the navigation signals broadcast by the plurality of satellites and computing a position of the at least one user device based on the received navigation signals. The at least one user device can broadcast a surveillance signal to the plurality of satellites so that the position of the at least one user device can be computed by the processing apparatus.

Preferably, the surveillance signal broadcast by the at least one user device is a dual frequency surveillance signal which the processing apparatus uses to compute correction factors for ionospheric induced time delays in signals traveling through the ionosphere between the at least one user device and each satellite of the plurality of satellites that received the surveillance signal. The processing apparatus using the correction factors and the surveillance signals can compute a more accurate position of the user device. Preferably, the correction factors are transmitted to the at least one user device so that the at least one user device can use the correction factors along with navigation signals to compute a more accurate position of the at least one user device. The GCNS system thereby provides surveillance capabilities for the plurality of satellites that correct for ionospheric delay and also provides the at least one user device with correction factors so that a more accurate position of the at least one user device can be computed by the at least one user device.

Preferably, each satellite of the plurality of satellites has communication switching capabilities so that each satellite of the plurality of satellites can route communication signals to a desired recipient. The network can be formed by having each satellite of the plurality of satellites directly communicating with at least two other satellites of the plurality of satellites, with at least two ground stations, or with at least one other satellite of the plurality of satellites and at least one ground station so that redundant communication paths exist and each satellite of the plurality of satellites is capable of communicating with any other satellite of the plurality of satellites either directly or through the network.

Preferably, the at least one user device is one of a plurality of user devices with each user device of the plurality of user devices providing dual frequency surveillance signals to the plurality of satellites. The processing apparatus is capable of using the dual frequency surveillance signals to compute a model which describes variation of an ionospheric induced time delay in signals traveling through the ionosphere as a function of geographic location. Correction factors for the ionospheric induced time delay in signals passing through the ionosphere are computed for each line of sight between the plurality of user devices and the plurality of satellites that receive the surveillance signals. The model along with the correction factors are broadcast by the plurality of satellites so that a device capable of receiving and processing these broadcasts can use the navigation signals along with the model and correction factors to compute a more accurate position of the device. The GCNS system thereby provides a map of the ionosphere along with correction factors to allow for increased accuracy in the determination of the position of one of the user devices without the need for extensive use of ground based monitoring stations. Because the ionospheric delay scales linearly with frequency, the ionospheric delay model broadcast by the system can be used to correct for ionospheric delay on any frequency used by the system. Consequently, improved accuracy can be achieved for single frequency navigation or surveillance users.

The GCNS system also provides the ability to verify the accuracy of the position determined by a user device. The user device can broadcast its computed position (based on received navigation signals) along with the surveillance signals. The processing apparatus can use the surveillance signal broadcast by a user device to compute a position of the user device. The location of the user device based on the surveillance signals can be compared to the reported position of the user device to determine the difference between the two computed positions. This comparison provides a degree of integrity checking to the system. If the positions differ by more than a predetermined amount an error is probably occurring somewhere in the system and the processing apparatus can perform a system integrity check of the plurality of satellites to verify that each satellite is broadcasting correct navigation signals. Additionally, the GCNS system can notify the user device of the difference between the two computed positions and whether the system integrity has been verified so that the user can have a correct position of the user device.

Monitoring stations can be provided that are fixed on the earth at known positions and are capable of receiving the navigation signal and of two-way communication with the plurality of satellites. The monitoring stations can operate similarly to the user devices. The monitoring stations can monitor the navigation signals and compute the indicated position of the monitoring station based on the navigation signals so that the integrity of the system can be checked. The monitoring stations can also broadcast dual frequency surveillance signals to the satellites so that the delay in signals travelling through the ionosphere between the monitoring stations and the satellites that receive the surveillance signals can be measured and corrected for. In this way, adequate sampling of the ionosphere can be achieved even in geographic regions where user densities are too low to otherwise provide a large enough number of ionospheric delay observations.

Additional capabilities are also realized with the GCNS system. When a user device is not able to receive the navigation signals being broadcast by the plurality of satellites the user device can communicate to the GCNS system that it is not receiving the navigation signals. The processing apparatus can then perform a system integrity check to ensure that the plurality of satellites are properly broadcasting the navigation signals. If the plurality of satellites are found to be operating correctly, then either the user device is malfunctioning or there is an interference source that is interfering with the reception of the navigation signals by the user device. When there are a plurality of user devices within a region that report not receiving navigation signals and the satellites are found to be operating correctly, the processing apparatus can use the positions of the plurality of user devices (computed based upon surveillance signals sent by the user devices) to determine the probable location of an interference source that is preventing the reception of the navigation signals. The GCNS system can then report the problem and the probable location of the interference source to a desired recipient such as a state's frequency management authority. In this manner, the operation of the GCNS system can be continually monitored and probable locations of interference sources can be determined.

The GCNS system provides a robust navigation capability because the tightly coupled communications, navigation and surveillance capabilities allow the surveillance and navigation capabilities to act as a backup for each other. For example, if one of the plurality of user devices is unable to receive the navigation signals broadcast by the plurality of satellites, the system can use the surveillance function to obtain a position fix for the user and provide the position fix to the user over the communications link. A backup navigation mode is realized in this manner. Similarly, if the system is unable to perform the surveillance function for a particular user device, then the user device may broadcast its position as determined from the navigation signals broadcast from the satellites. A backup surveillance mode is realized in this manner.

Another benefit realized by the GCNS system is that the processing apparatus is capable of computing the ephemeris of each satellite of the plurality of satellites based upon signals broadcast by each satellite of the plurality of satellites. Preferably, the processing apparatus uses the computed ephemeris of each satellite of the plurality of satellites to compare it with the navigation signals being broadcast by each satellite of the plurality of satellites to ensure that the plurality of satellites are broadcasting correct navigation signals. Because the satellites communicate with each other, the processing apparatus can correct the navigation signals being broadcast by each satellite of the plurality of satellites found to be in error. The GCNS system can thereby autonomously monitor and correct itself when incorrect navigation signals are being broadcast by one of the satellites.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a drawing of the GCNS system showing the ability for peer to peer communication.

DETAILED DESCRIPTION OF THE PREFERRED EMBODIMENTS

The following description of the preferred embodiment(s) is merely exemplary in nature and is in no way intended to limit the invention, its application, or uses.

Figure 1:
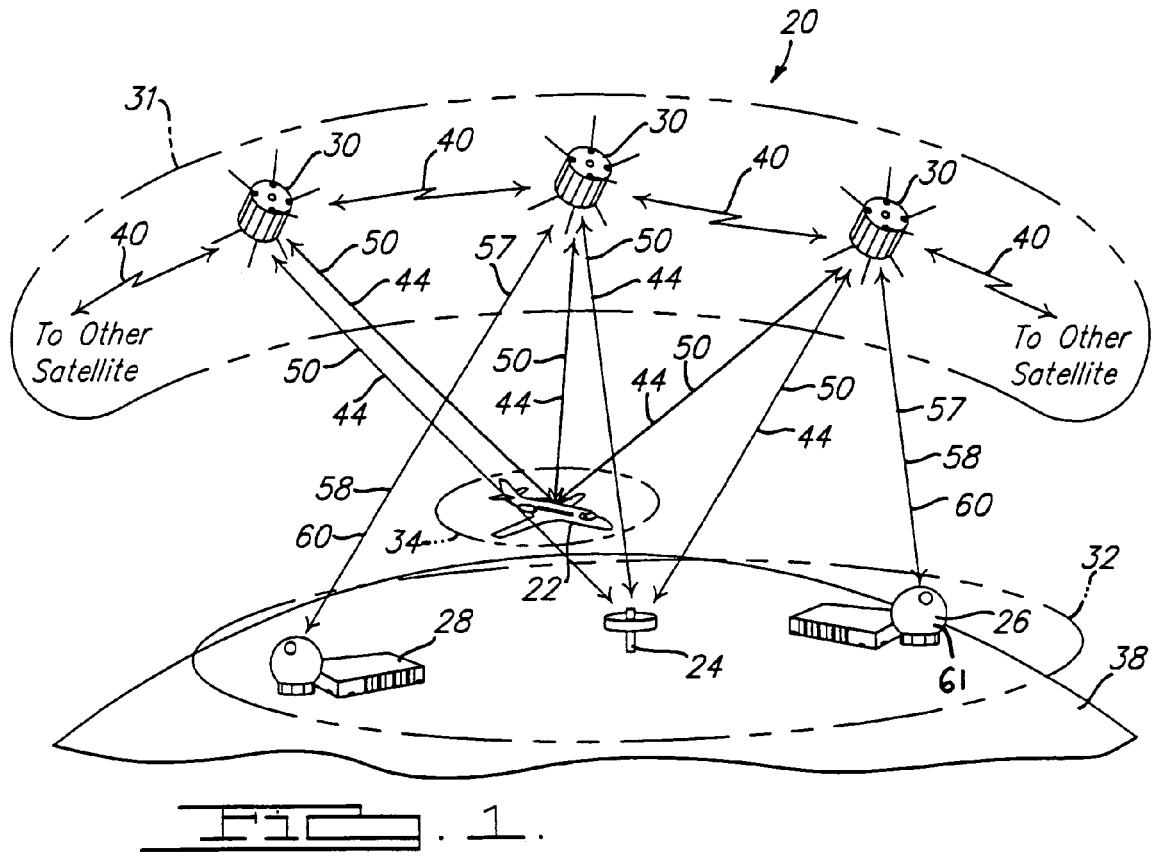
FIG. 1 is a simplified overview of the GCNS system of the present invention.

Referring to FIG. 1, there is shown a GCNS system 20 in accordance with a preferred embodiment of the present invention. The GCNS system 20 provides communications, navigation and surveillance capabilities to and from a mobile user device 22, a monitoring station 24, a master control station (MCS) 26, a satellite network access gateway (SNAG) 28 and/or a plurality of satellites 30. The MCS and SNAG are also referred to as ground stations.

The GCNS system 20 generally comprises a space segment 31, a terrestrial segment 32, and a user segment 34. The space segment 31 may include any number of satellites 30 needed to provide coverage for any given region of the earth 38 where mobile user devices 22 are expected to be used. Preferably, there are enough satellites 30 so that a user device 22 is within a line of site of at least three satellites 30 and even more preferably is within a line of site of at least four satellites 30. The satellites 30 are time synchronized. As is well known in the art and as will be explained below, if the user device 22 has a line of sight to three satellites 30 a position of the user device 22 can be determined based upon signals sent between the satellites 30 and the user device 22.

In order to provide adequate coverage for the entire earth 38, the GCNS system 20 will preferably use between 18 to 30 satellites 30. Preferably, the satellites 30 are high powered medium earth orbit satellites. However, geosynchronous satellites may also be integrated into the GCNS system 20. Each satellite 30 is preferably a state-of-the-art digital processing satellite that is programmable on orbit. Because the satellites 30 are programmable on orbit, modifications to services or entirely new services can be introduced as the system evolves without the need to wait for the satellites 30 to be refreshed. The programmable on orbit capability allows the GCNS system 20 to evolve to meet the needs of the civil community.

Each satellite 30 of the space segment 31 carries a Navigation and Timing (NT) payload (not shown) as well as an Integrated Communications/Surveillance (ICS) payload (not shown). The satellites 30 also include a very large aperture antennae (approximately 20 to 50 feet in diameter) (not shown) to support the ICS capabilities of the satellites 30. Preferably, at least one of the satellites 30 is capable of measuring the Time of Arrival (TOA) or Time Difference of Arrival (TDOA) of surveillance signals received by the satellites 30, as will be explained in more detail below. Even more preferably, each satellite 30 is capable of measuring the TOA or TDOA of surveillance signals received by the satellites 30.

Each satellite 30 is part of a network that allows each satellite 30 to communicate with any other satellite 30 of the plurality of satellites 30 in the GCNS system 20. Preferably, the network is formed by having each satellite 30 connected to at least two other satellites 30 via wide band cross links 40. However, it should be understood that while it is preferred to use cross links 40, other satellite constellation architectures that do not employ cross links 40 are possible and are within the scope of the invention as defined by the claims. The cross links 40 allow the satellites 30 to transfer data to/from other satellites 30. The cross links 40 have a high data transfer capacity sufficient to support the communications and surveillance functions of the GCNS system 20. The cross links 40 connect all of the satellites 30 to form a network with redundant paths so that information can be moved from any satellite 30 to any other satellite 30 in the space segment 31 via the cross links 40. The cross links 40 are monitored by the satellites 30 and may be used to develop a range measurement between satellites 30. If a satellite 30 fails or is removed from the network, the network is reconfigured by establishing new cross links 40 that bypass the removed satellite 30 so that the network continues to operate. In the same manner, a new or repaired satellite 30 can be introduced into the network. The ICS payload allows each satellite 30 of the space segment 31 to operate as a communication switch to route communications signals to a desired recipient. The linked space segment 31 thereby forms a robust communications backbone through which the full capabilities of the GCNS system 20 can be realized.

The network can also be formed by having each satellite 30 directly communicating with at least one other satellite 30 and at least one ground station or by having each satellite 30 directly communicating with at least two ground stations. The network thereby provides redundant communication paths so that information can be moved from any satellite 30 to any other satellite 30 in the space segment 31 via the network. The communication between the satellites 30 and the ground stations will be discussed in more detail below.

Preferably, the GCNS system 20 operates on nine frequencies. The navigation services provided by the GCNS system 20 build on the services currently provided by GPS. The GCNS system 20 provides ranging or navigation signals 44 on three different frequencies. Preferably, all three navigation signals 44 are in frequency bands allocated by the ITU for Aeronautical Radionavigation Services (ARNS) as well as for Radio Determination Satellite Services (RDSS). The first navigation signal 45, is preferably broadcast at 1575.42 megahertz and is equivalent to the L1 C/A signal used by the GPS today. In addition, the first navigation signal 45 preferably includes a new set of codes with improved cross correlation properties and is broadcast in quadrature with the C/A code signal. The second navigation signal 46, is preferably broadcast at 1176 megahertz and is equivalent to the L5 signal as defined in RTCA DO-261. The third navigation signal 47, is similar in structure to the second navigation signal 46. The frequency at which the third navigation signal 47 is to be broadcast has yet to be determined. The third navigation signal 47 is designed to support three frequency carrier ambiguity resolution positioning for the user segment 34.

The integrated communications/surveillance capabilities of the satellites 30 are performed via the ICS signals 50. The ICS signals 50 comprise three signals, C1, C2, and C3 which are indicated as 52, 54, and 56. The ICS signals 50 are preferably one to five megachip spread spectrum signals similar to those defined in CDMA-2000. The C1 signal 52 provides communication from the satellites 30 to the user segment 34 and/or the monitoring stations 24. The C2 signal 54 provides communications/surveillance from the user segment 34 and/or the monitoring stations 24 to the satellites 30. The C3 signal 56 is a second communications/surveillance signal from the user segment 34 and/or the monitoring stations 24 to the satellites 30. The C3 signal 56 preferably is at a frequency several hundred MHz above or below the frequency of the C2 signal 54. In a preferred embodiment, the third navigation signal 47 is placed in the same band as the C1 signal 52 so that the third navigation signal 47 may also act as a pilot tone for initial acquisition and synchronization of the user equipment within the GCNS system 20.

The terrestrial segment 32 communicates with the space segment 31 via feeder link signals 57. However, some components of the terrestrial segment 32, such as the monitoring stations 24, may communicate with the space segment 31 via the ICS signals 50. The feeder link signals 57 are comprised of two signals, FL1 and FL2 58, 60. The FL1 signal 58 is the feeder link between the terrestrial segment 32 and the space segment 31. The FL2 signal 60 is the feeder link from the space segment 31 to the terrestrial segment 32. Both the FL1 and FL2 signals 58, 60 are preferably at a frequency band typically used for such feeder links 57, such as the Ka or Ku band.

While the above description of some of the various signals used in the GCNS system 20 have been described with references to specific frequencies and other properties, it is to be understood that these descriptions are provided for exemplary purposes and are not to be construed as limiting the scope of the invention as defined by the claims. Additionally, the frequencies and properties of the various signals may change to increase the performance of the GCNS system 20 or to meet regulatory requirements of various government agencies that control the frequencies on which the GCNS system 20 can operate.

The user segment 34 is comprised of at least one mobile user device 22 and preferably a plurality of mobile user devices 22. The GCNS system 20 is designed to support simple, inexpensive, integrated mobile user devices 22. Because the user devices 22 are mobile, the GCNS system 20 is designed to support small, lightweight equipment with low power consumption requirements. However, it is to be understood that the user devices 22 will come in packages that range from small hand held units to rack mounted base station transceiver units with expanding capabilities. The mobile user device 22 could comprise aircraft, cruise ships, or any other moving vehicle. Thus, the illustration of the mobile user device 22 as aircraft in the FIGS. herein should not be construed as limiting the applicability of the system 20 to only aircraft. The GCNS system 20 is designed to work with all these various types of user devices 22. Additionally, while the user devices 22 are discussed as being mobile, it is not necessary for the user devices 22 to be mobile to operate with the GCNS system 20. The user devices 22 connect to the satellites 30 via the three ICS signals 50 and the three navigation signals 44.

The terrestrial segment 32 comprises the MCS 26 and, preferably, one or more backup MCSs (not shown). The terrestrial segment 32 may also comprise the SNAG 28 and any number of monitoring stations 24. The MCS 26 and the SNAG 28 facilities are connected to one or more satellites 30 of the space segment 31 via the feeder link signals 57 and/or the three ICS signals 50. The monitoring stations 24 are preferably connected to the satellites 30 via the three ICS signals 50 and the three navigation signals 44. A processing apparatus 61, such as a computer or the like, is also included in the terrestrial segment 32. As is known in the art, the processing apparatus monitors the GONS system 20 and performs positioning calculations for user devices 22, satellites 30 and any other device connected to the GCNS system 20.

Figure 3:
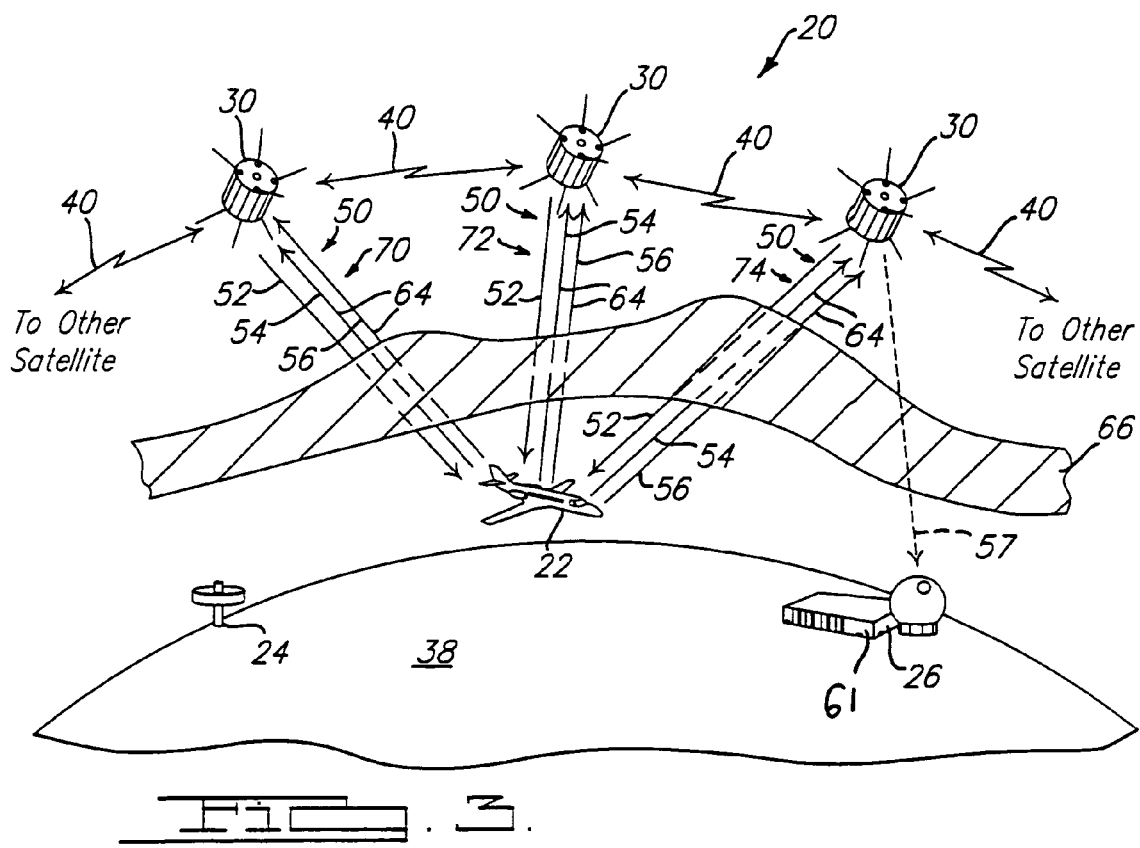
FIG. 3 is a diagram of the GCNS system of FIG. 1 showing a user device communicating with the satellites of the GCNS system via the ICS signals with the ICS signals travelling through the ionosphere.

The processing apparatus can also control the communications functions of the space segment 31. The processing apparatus 61 can be located in the MCS 26, as indicated in FIGS. 1, 3, and 5, or can be in a different ground station. It is also possible to have the processing apparatus 61 located in one of the satellites 30 of the space segment 31.

The MCS 26 is preferably the primary control segment for the GCNS system 20. The MCS 26 is responsible for the Telemetry and Control (T&C) communications with the satellites 30. T&C instructions for the space segment 31 are delivered to all the satellites 30 via the FL1 signal 58, the network, and the cross links 40, as required, so that T&C commands can be delivered to or issued from any satellite 30 at any time. Preferably, the MCS 26 is capable of directly communicating with a minimum of three satellites 30 at all times via the feeder link signals 57. The network, the cross links 40, and the ability of the MCS 26 to communicate simultaneously with a minimum of three satellites 30 via the backhaul signals 57 results in redundant, full time monitoring and control of the space segment 31. The MCS 26 may also operate as a Network Operation Center (NOC)(not shown). The NOC controls the operations of the communications capabilities of the GCNS system 20. The NOC may also be separate from the MCS 26. Preferably, the processing apparatus is part of the NOC.

The SNAG 28 provides a connection between the communications capabilities of the GCNS system 20 and the terrestrial communications network (not shown) in various regions around the world. The SNAG facilities 28 could be operated by regional service providers or service resellers of the communication and surveillance capabilities of the GCNS system 20. The SNAG facilities 28 access one or more satellites 30 using the feeder link signals 57. Because the SNAG facilities 28 can be operated by regional service providers or service resellers, the SNAG facilities 28 do not have T&C capabilities.

The monitoring stations 24 are similar to the user devices 22. The monitoring stations 24 have navigation receivers (not shown) capable of receiving the navigation signals 44 and of receiving and sending the ICS signals 50. The monitoring stations 24 communicate with the MCS 26 or other appropriate devices within the system (not shown) by communicating with the space segment 31 via the ICS signals 50 and the space segment 31 in turn communicates with the MCS 26 or other appropriate devices (not shown) via the feeder link signals 57. The monitoring stations 24 check various aspects of the navigation signals 44 and the ICS signals 50 and sends an alarm via the ICS signals 50 if a problem is found. Otherwise, the monitoring stations 24 report nominal status with a short burst of data on two frequencies, such as the C2 and C3 signals 54, 56 that can be used by the GCNS system 20 to measure ionospheric delay, as will be discussed below. The short data bursts also protect the monitoring stations 46 from exposure to latent failures. The monitoring stations 24 can check the navigation signals 44 continuously, at scheduled intervals, and/or as requested or polled by the GCNS system 20.

The GCNS system's 20 communication services are based on spread spectrum communications. The wave forms and signaling protocols are designed to support basic data and voice communications. FIG. 5 illustrates a typical peer to peer communications connection between user devices 22. In this example, one user device is on an aircraft flying through the air and the other user device is in a stationary building perhaps halfway around the world. The primary link between either user device 22 and a satellite 30 is through a single spot beam 62 on a single satellite 30. The communications switching capabilities of the satellites 30 are used to connect the two user devices 22. The user device 22 could also be connected to a monitoring station 24, the MCS 26, or a SNAG 28 by using the communications switching capabilities of the satellites 30. If the monitoring station 24, the MCS 26, a SNAG 28, or other user device 22 is connected to another satellite 30, as is shown in FIG. 5, one or more cross links 40 and one or more satellites 30 may be required to be used to facilitate the connection. Thus, the GCNS system 20 supports user to user or peer to peer communication along with communication between all of the components of the GCNS system 20.

Figure 2:
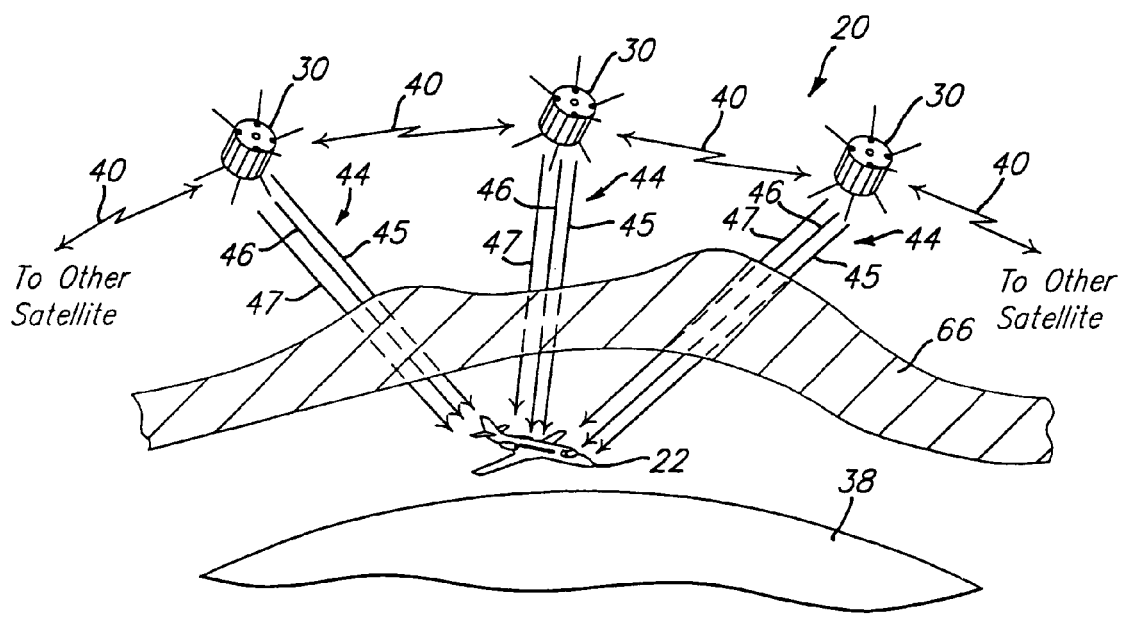
FIG. 2 is a diagram of the GCNS system of FIG. 1 showing the navigation signals travelling through the ionosphere to a user device.

Referring now to FIG. 2, the navigational capabilities of the GCNS system 20 are shown. The satellites 30 broadcast navigation signals 44 from each satellite 30 of the space segment 31. The navigation signals 44 contain information related to the position of the satellite 30 from whence the signal originated along with the time at which the signal was sent. Preferably, each satellite 30 of the space segment 31 have multiple atomic clocks and a very accurate system time is transferred to each satellite 30 of the space segment 31 through the network or cross links 40 so that all the satellites 30 are time synchronized and the GCNS system 20 can provide useful navigational services. The synchronizing of the time on each satellite 30 is performed by methods well known in the art. Preferably, the navigation signals 44 broadcast by each satellite 30 of the space segment 31 are three signals broadcast on three different frequencies, as was discussed above. A user device 22 receiving the navigation signals 44 broadcast by the satellites 30 can compute its position based upon the received navigation signals 44, as will be discussed in more detail below.

The GCNS system 20 also includes a surveillance capability. The surveillance capability and the navigation capabilities operate along the same principles. As shown in FIG. 3, the user device 22 can broadcast omni directional surveillance signals 64 to the space segment 31 via the C2 and C3 signals 54, 56. Preferably, the surveillance signals 64 sent by the user device 22 include a special coded sequence designed for rapid acquisition and precise determination of the time of arrival (TOA) of the surveillance signals 64. This coded sequence is used to independently measure the position of the user device 22 when it is using the communication capabilities of the GCNS system 20. To use this capability, the user device 22, after being turned on, logs in to the GCNS system 20. The user device 22 negotiates a surveillance reporting interval with the GCNS system 20. Then at the prescribed time, the user device 22 broadcasts omni directionally the coded sequence within the surveillance signals 64. The satellites 30 search for the coded sequence based on the last known or current projected position of the user device 22. The surveillance signals 64 are then received by three or more satellites 30 and, preferably, by four or more satellites 30 in order to achieve the best accuracy. Each satellite 30 then correlates the received surveillance signals 64 with a local replica of the expected coded sequence in order to establish the TOA of the coded sequence within the surveillance signal 64. The surveillance signals 64 may also include a sequence that corresponds to other measurements performed by the user device 22 or provided to the user device 22 from another source. For example, when the user device 22 is on an aircraft the surveillance signals 64 may include a sequence that informs the GCNS system 20 of the barometric altitude of the user device 22 at the time of the broadcasting of the surveillance signals 64. The fusion of sensor readings into the surveillance signals 64 to aid in the position solution is known to those skilled in the art.

After reception, the TOA, the user ID and any other data attached to the surveillance signals 64 are forwarded via the cross links 40, FL1 signal 58, and/or C1 signal 52 to the processing apparatus. The processing apparatus receives multiple TOA information from each satellite 30 that received the surveillance signals 64 from the user device 22. The TOA along with the time of transmission from the user device 22 give a time interval which can be considered to be a pseudo range measurement from the satellite 30 to the user device 22. Preferably, the measure of the time interval is performed on one or more of the satellites 30 in the space segment 31 and then communicated to the processing apparatus so that the processing apparatus is provided with the time interval to be used as a pseudo range measurement from the satellite 30 to the user device 22. Given the precise knowledge of the locations of the satellites 30 that is available throughout the GCNS system 20, the pseudo ranges can be used to solve for the user device's 22 position. Each pseudo range defines the radius of a sphere about the known position of the satellite 30 that received the surveillance signals 64. The user device 22 must be positioned on the surface of that sphere. Multiple pseudo ranges define multiple spheres and the position of the user device 22 must be somewhere on the intersection of the spheres. Thus the GCNS system 20 is capable of determining the position of a user device 22 based on the surveillance signals sent by the user device 22. This type of position solution is well known from current GPS applications and can also be used by the user device 22 to compute the position of the user device 22 when receiving the navigation signals 44 from the GCNS system 20.

Alternatively, Time Difference of Arrival (TDOA) techniques may be used to determine the position of the user device 22 based on surveillance signals 64 sent by the user device 22. For each set of TOAs, the GCNS system 20 can compute $N!/(2!(N-2)!)$ time differences of arrival. Preferably, the TOAs are computed by one or more satellites 30 in the space segment 31 and then communicated to the processing apparatus which in turn computes the TDOAs for various satellite pairs. Each TDOA defines a surface (which happens to be a hyperbola) upon which the user device 22 must be in order for the two observers (the two satellites 30 that provided the set of TOAs) to see the associated TDOA. Multiple TDOAs define multiple hyperbolas upon which the user device 22 must be located. Therefore, the user device 22 must be positioned at the intersection of the multiple hyperbolas.

Figure 4:
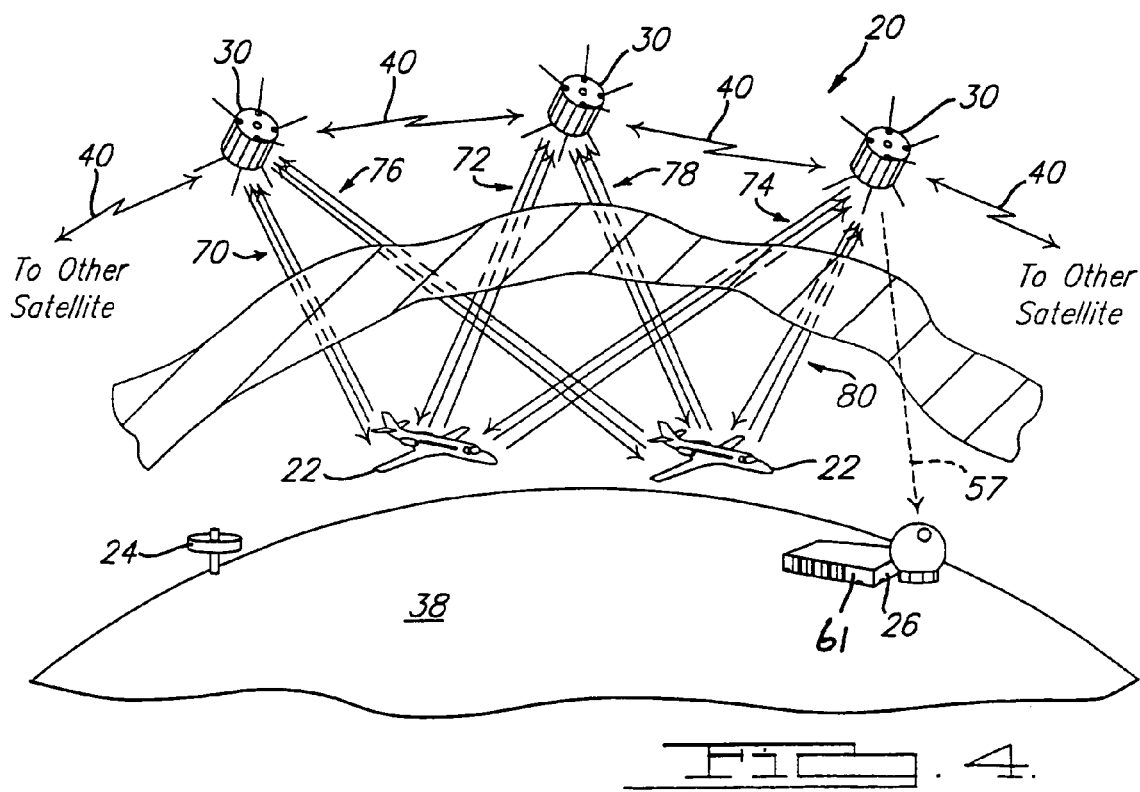
FIG. 4 is a diagram of the GCNS system of FIG. 3 with two user devices communicating with the satellites via ICS signals traveling through the ionosphere.
Figure 3:
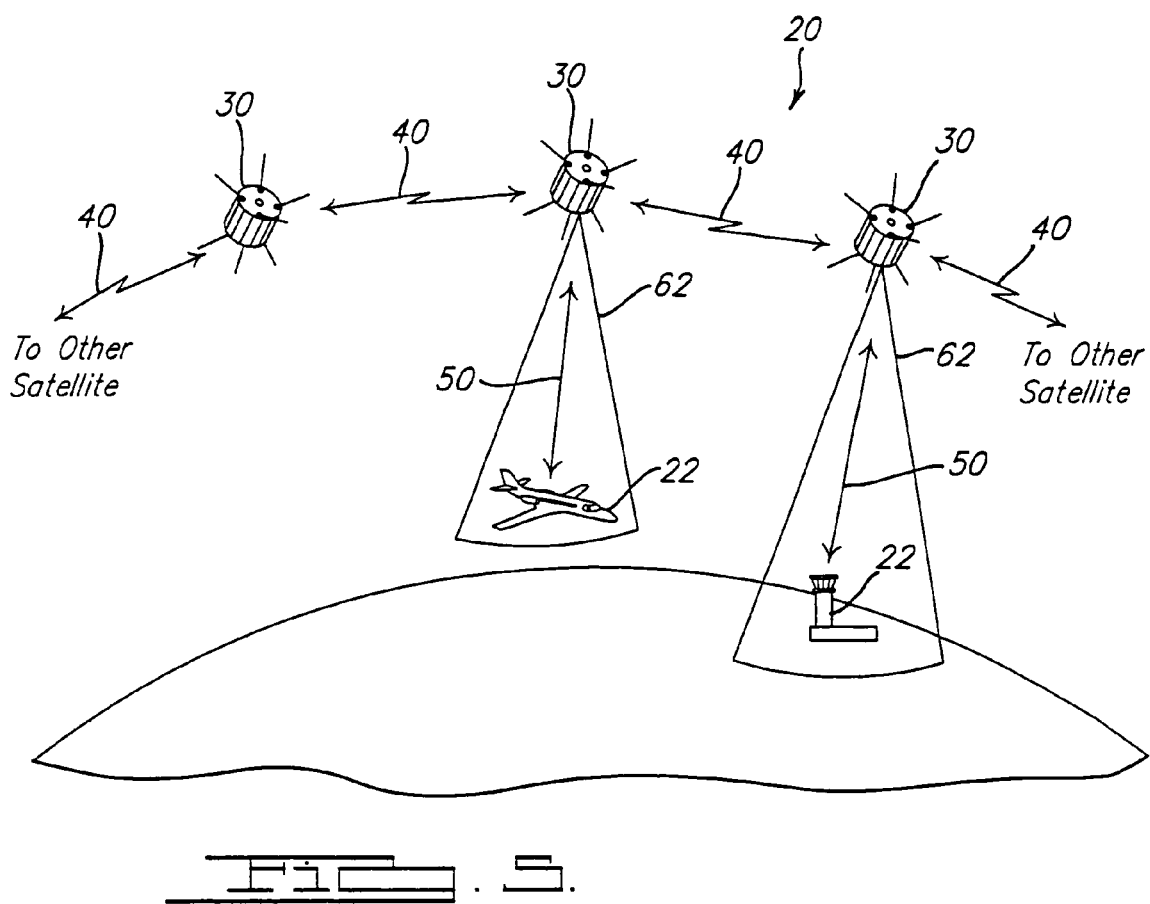

In use, the surveillance capabilities of the GCNS system 20, as shown in FIGS. 3 and 4, can be used to monitor the time delay induced in signals traveling through the ionosphere 66 which is located between the space segment 31 and the terrestrial segment 32 and/or the user segment 34. Preferably, the surveillance signals 64 broadcast by the user device 22 are two signals on two different frequencies, such as the C2 signal 54 and the C3 signal 56. Even more preferably, the C2 and C3 signals 54, 56 are phase coherent and chip synchronous at the phase center of a transmit antenna (not shown) (to the extent possible) on the user device 22. The ionosphere 66 will induce different time delays in the two surveillance signals 64. The relative difference between the two arrival times of the surveillance signals 64 on the two different frequencies can be used to measure the ionospheric delay induced in signals traveling through the ionosphere 66, as is known to those skilled in the art. In this way, the GCNS system 20 directly collects information about the ionosphere 66 from any user device 22 that broadcasts surveillance signals 64 on two different frequencies.

The satellites 30 that receive the surveillance signals 64 transmitted on two different frequencies provide the time of arrival information for both the C2 signal 54 and the C3 signal 56 to the processing apparatus. The processing apparatus will then compute the delay induced by the ionosphere 66 in signals traveling through the ionosphere 66. Alternatively, the difference in the TOAs of the two frequencies may be computed on the satellite 30 and the result sent to the processing apparatus. Because the surveillance signals 64 are received by multiple satellites 30 the surveillance signals 64 travel through different portions of the ionosphere 66. The locations at which the surveillance signals 64 (or any signals) travel through the ionosphere 66 are called pierce points. The processing apparatus collects slant range ionospheric delay measurements for pierce points where the line of sight from the user device 22 to the satellites 30 passes through the ionosphere 66. Because the electron density of the ionosphere 66 varies throughout the ionosphere 66, the delay induced by the ionosphere 66 in signals travelling through the ionosphere 66 may be different for each pierce point or specific line of sight between the user device 22 and the satellites 30. Therefore, the processing apparatus will measure the slant range ionospheric delay for each pierce point based upon the path the surveillance signals 64 travel to reach the various satellites 30. As is known in the art, an international standard has been created that divides the ionosphere 66 into a sampling grid of known coordinates. The ionospheric delay for each pierce point can be used with the grid to develop a model of the measured ionspheric delay for the various grid locations for which measurements are available. When the number of user devices 22 is large, the GCNS system 20 will be collecting ionospheric delay measurements for a very large number of pierce points and may allow the development of new grid coordinates that are more compact due to the large number user devices 22 that provide signals that can be used to measure ionospheric delay. Therefore, the GCNS system 20 may allow for a denser grid to be created for the ionosphere 66 and result in a more precise model of time delays caused by the ionosphere 66.

The slant range ionospheric delay measurements can be used to determine a nominal vertical delay at any arbitrary point by interpolating the pierce point measurements after correction by anobliquity factor as is well known in the art. The nominal vertical delay model of the ionosphere 66 developed from the ionospheric delay measurements then becomes a resource that the GCNS system 20 can use to compute the expected delay for any arbitrary line of sight through the ionosphere 66 covered by the sampling grid. Because the time delay scales directly with frequency, ionospheric delay data measured via the surveillance signals 64 may be used to develop corrections for the delay experienced by the navigation signals 44 on their respective frequencies. Similarly, the delay model may also be used to determine the ionospheric delay for a single frequency surveillance user.

As can be seen in FIG. 3, when the surveillance signals 64 travel from a single user device 22 to three different satellites 30 the user device 22 has three different lines of sight 70, 72, 74 to the three different satellites 30 and the ionosphere is pierced in three different places based on the three different lines of sight 70, 72, 74 the surveillance signals 64 follow to reach the satellites 30. The processing apparatus measures the time delay induced in the surveillance signals 64 on each of the three lines of sight 70, 72, 74. For example, the processing apparatus will measure the time delay in the surveillance signals 64 caused by the surveillance signals 64 traveling along line of sight 70 of the ionosphere 66. The processing apparatus will do the same for the lines of sight 72, 74.

The number of pierce points by which the ionosphere 66 is sampled is dependent upon the number of user devices 22 broadcasting surveillance signals 64 and the number of satellites 30 that receive the surveillance signals 64. As can be seen in FIG. 4, when two user devices 22 are broadcasting surveillance signals 64, the ionosphere 66 might be sampled by six pierce points that correspond to the six lines of sight 70, 72, 74, 76, 78, 80 between the two user devices 22 and the three satellites 30 that receive the surveillance signals 64. In this manner, the GCNS system 20 uses the user devices 22 to monitor the state of the ionosphere 66 and correct for ionospheric induced time delays in the surveillance signals 46.

Preferably, the processing apparatus broadcasts the vertical delay model as sampled at an appropriately spaced grid of coordinates. The coordinates of the grid are known to the user devices and adhere to a simple numbering system. The coordinate numbers and the correction factors can be included in the navigation signals 44 or sent via the ICS signals 50. Preferably, the user device 22 can receive the correction information along with the coordinate numbers and compute corrections for the ionospheric induced time delays in signals from the GCNS system 20 received by the user device 22 that travel along the line of sight specific to the user device's 22 location. This will allow the user device 22 to calculate a more accurate position of the user device 22.

The GCNS system 20 also makes it possible for the user device 22 to measure the ionospheric delay caused in navigation signals 44 travelling from the satellites 30 through the ionosphere 66 and to the user device 22. Like the surveillance signals 64, the satellites 30 can broadcast navigation signals 44 on two different frequencies, such as the first navigation signal 45 and the second navigation signal 46. Preferably, the satellites 30 can broadcast navigation signals 44 on three different frequencies, as discussed above. When using the user device 22 to measure the ionospheric induced time delays, it is preferred that the first and second navigation signals 45, 46 be phase coherent and chip synchronous at the phase center of a satellite transmit antenna (not shown) (to the extent possible) so that the relative difference between the two arrival times of the first and second navigation signals 45, 46 can be used to measure the ionospheric induced time delay. The user device 22 can then correct for the ionospheric delay in the received navigation signals 44 and calculate a more accurate position of the user device 22.

The user device 22 can also communicate the results of measuring the ionospheric induced time delay to the space segment 31 so that the space segment 31 can use the measurements to correct for ionospheric induced time delays in signals received by the space segment 31 and/or share the correction information with other users of the GCNS system 20. In this way, the GCNS system 20 directly collects information about the ionosphere from any suitably equipped user device 22. Because the user devices 22 are mobile, the portion of the ionosphere 66 being measured at any given time by a single user device 22 can vary and measures of the ionosphere 66 can be made from locations where terrestrial based monitoring stations 24 are impractical, such as over the water. Furthermore, because the line of sight for the ionospheric delay observations is relatively insensitive to the position uncertainty of the user device 22, ionospheric data can be obtained from non-stationary platforms such as buoys etc. In this way, the monitoring network can be extended into regions simply not possible for an SBAS which relies on terrestrial communications capabilities.

Because the GCNS system 20 can directly measure the ionosphere 66 from signals broadcast by user devices 22 and can collect ionospheric measurements made by user devices 22 the need for ground based monitoring stations 24 is reduced and can possibly be eliminated in some areas. However, if not enough user devices 22 are actively using the GCNS system 20, monitoring stations 24 can be utilized to fill in any gaps in information about the ionosphere 66. Therefore, the GCNS system 20 is preferably designed so that the monitoring stations 24 can also be used to measure the ionospheric induced time delay in signals traveling through the ionosphere 66. The monitoring stations 24 can be equipped similar to the user devices 22 in that the monitoring stations 24 would be capable of sending surveillance signals 64 on two different frequencies and also capable of receiving dual frequency navigation signals 44 from the satellites 30. The monitoring stations 24 can then function just as the above described user devices 22 function. Because the monitoring stations 24 communicate with the space segment 31 via the ICS signals 50, the need for a terrestrial based communication network to connect the monitoring stations 24 to the processing apparatus is eliminated.

The GCNS system 20 can be used to confirm the position of a user device 22 calculated by the user device 22. As was described above, the user device 22 can calculate its position based on navigation signals 44 received by the user device 22. The user device 22 can then communicate its calculated position to the space segment 31 via the C2 signal 54 and/or the C3 signal 56. The user device 22 can also transmit surveillance signals 64 to the space segment 31 so that the processing apparatus can independently compute a position of the user device 22. The processing apparatus can compare the position computed by the user device 22 with the position computed by the processing apparatus. If the two calculated positions differ by more than a predetermined amount there may be an error in the GCNS system 20.

When the two calculated positions differ by more than the predetermined amount, the processing apparatus can check the integrity of the space segment 31 to see if an error is occurring in the space segment 31. The processing apparatus can request, via the cross links 40 or the network, the navigation signals 44 being broadcast by each satellite 30 and compare the navigation signals 44 of each satellite 30 with the ephemeris of the satellites 30 to ensure that each satellite 30 is broadcasting a correct navigation signal 44. If an error in the navigation signals 44 being broadcast by any of the satellites 30 is found, the space segment 31 can be reconfigured to exclude the satellite 30 that is experiencing the error in its navigation signals 44. When the error is corrected, the space segment 31 can again be reconfigured to include the repaired satellite 30 in the space segment 31. The processing apparatus can report the error to the master control station 26 via the FL2 signal 60. Additionally, the space segment 31 can transmit to the user device 22 via the C1 signal 52 a message indicating that an error is occurring in the space segment 31. The user device 22 will then know to disregard the affected satellite 30 and compute the position of the user device 22 based only on healthy satellites 30. In this manner, the GCNS system 20 is self monitoring and can autonomously detect and correct errors occurring in the GCNS system 20 and the user device 22 can obtain its correct position.

If the two calculated positions differ by more than the predetermined amount and an error in the space segment 31 is not found, the space segment 31 can transmit to the user device 22 via the C1 signal 52 the position of the user device 22 calculated by the space segment 31 and a message indicating that no error in the space segment 31 has been found. A user of the user device 22 is then aware that the user device 22 may be malfunctioning and should be checked while also being provided with a correct position of the user device 22. In this manner, the GCNS system 20 enables a user with a malfunctioning user device 22 to continue to use the user device 22 to monitor the position of the user device 22.

The GCNS system 20 can also monitor the ephemeris of the space segment 31. The relative ephemeris of the space segment 31 can be determined and monitored by the space segment 31. Preferably, each satellite 30 is connected via cross links 40 to three other satellites 30 and even more preferably to four or more satellites 30. The satellites 30 can transmit their navigation signals 44 to the other satellites 30 via the cross links 40 and the processing apparatus can then compute the position of any satellite 30 relative to any other satellite 30 of the space segment 31 based on the navigation signals 44 and satellite 30 to satellite 30 range measurements made via the cross links 40. In this scenario, the navigation signals 44 are treated as surveillance signals 64 and are used to determine the position of the transmitting satellite's 30 position relative to the position of the receiving satellites' 30 positions. The relative positions are determined based on the TOA and/or TDOA techniques discussed above. Additionally, the ephemeris of the satellites 30 relative to the earth can also be determined by the GCNS system 20. When three and preferably four terrestrial segment 32 components, such as a monitoring station 24, the MCS 26, and/or a SNAG 28 receive navigation signals 44 broadcast from the same satellite 30, that satellite's 30 position relative to the earth can be calculated by treating the broadcast navigation signals 44 as surveillance signals 64 and by using the TOA and/or TDOA techniques discussed above. The ephemeris of the remaining satellites 30 of the space segment 31 can then be determined relative to the satellite 30 whose ephemeris was determined relative to the earth. Because the cross links 40 do not travel through distorting mediums, such as the ionosphere, when travelling between the satellites 30, the positions of the satellites 30 relative to each other can be more accurately and easily determined. In this manner, the GCNS system 20 is capable of precise monitoring of the ephemeris of the space segment 31.

Another capability of the GCNS system 20 is the ability to detect and locate an interference source (not shown) that is interfering with one of the signals used by the GCNS system 20. For example, when a user device 22 is not receiving one of the navigation signals 44 being broadcast by the satellites 30, the user device 24 can communicate to the space segment 31 via the C2 signal 54 or C3 signal 56 that it is not receiving one of the navigation signals 44. The processing apparatus can then check the integrity of the space segment 31 and verify that each satellite 30 is broadcasting navigation signals 44. If all the satellites 30 are found to be broadcasting navigation signals 44, either the user device 22 is malfunctioning or something is interfering with the reception of the navigation signals 44 by the user device 22. In this manner, the GCNS system 20 can monitor the reception of the navigation signals 44 and detect if something is interfering with the reception of the navigation signals 44. If a number of user devices 22 all report to the space segment 31 that the same navigation signals 44 are not being received, the processing apparatus can determine the positions of the multiple user devices 22 based on surveillance signals 64 sent by the multiple user devices 22 and determine the probable location of the interference source. The space segment 31 can then report to a desired recipient that interference is occurring and also the probable location of the interference source.

Additionally, the space segment 31 can transmit via the C1 signal 52 to the user devices 22 that are not receiving the navigation signals 44 the position of the user device 22 calculated by the processing apparatus based on the surveillance signals 64 broadcast by the user devices 22. In this manner, when a user device 22 is not capable of computing its position based on navigation signals 44 received from the space segment 31, the space segment 31 can inform the user device 22 of its position. Thus, the GCNS system 20 provides redundancy in the determination of a position of a user device 22. Similarly, if one of the ICS signals 50 is not available, the user device 22 can report its autonomously derived position based upon received navigation signals 44 to the space segment 31 via the ICS signal 50 that is available.

The combination of navigation capabilities along with communication/surveillance capabilities provides significant capabilities to the GCNS system 20. The integrated communications capability provides connectivity to the monitoring stations 24. This saves the cost of a ground based network to connect the monitoring stations 24 to the processing apparatus. This architecture also enables a large, reconfigurable network of potentially simple monitoring stations 24. The surveillance signals 64 provide independent measurements of the ionospheric delay. In this way, every user device 22 can function as a monitoring station for ionospheric delay measurements. This will allow airplanes having a user device 22 on board that are flying over the ocean to provide measurement data about the state of the ionosphere 46 where no ground base monitoring station 24 is practical. Connecting the satellites 30 by cross links 40 supports satellite to satellite ranging for autonomous precise ephemeris determination and monitoring. Also, very precise orbit information can be generated and provided as a service for a fee. The two-way ranging provides redundancy for integrity monitoring. For surveillance applications, the user device 22 can broadcast its best estimate of its position. The GCNS system 20 can also independently measure the position of the user device 22. The two positions can be compared in order to detect integrity failures.

The ionospheric measurements and precise ephemeris may enable tropospheric measurements to be made, both by simple monitoring stations 24 and by the GCNS system 20 itself based on the surveillance ranging capability. If a sufficient number of user devices 22 or monitoring stations 24 are used in the GCNS system 20, a tomography of the ionosphere 66 can be created due to the large numbers of different lines of sight between the user devices 22 and/or monitoring stations 24 and the satellites 30. The ionospheric delay information can be also used to estimate water vapor content of the atmosphere. Furthermore, if other meteorological sensors are integrated into the relatively simple monitoring stations 24, the monitoring stations 24 should enable the development of a large reconfigurable network of meteorological stations.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for providing integrated communications and navigation information, the system comprising:
   a plurality of satellites networked together, each of said satellites broadcasting navigation signals and being capable of two way communication, and each of said satellites is capable of receiving and relaying surveillance signals;
   a user segment having at least one mobile user device, said user device being capable of receiving at least one of said navigation signals broadcast by said satellites and using said at least one received navigation signal to compute its position, and said user device being operable to broadcast a surveillance signal; and
   at least one monitoring station for receiving said navigation signals broadcast by said satellites, said at least one monitoring station computing its position based on said navigation signals and transmitting said computed position to at least one of said satellites and to a processing apparatus so that an integrity of said navigation signals can be checked, wherein said processing apparatus is capable of determining a position of a user device that broadcasts said surveillance signal and said user device is operable to communicate its computed position to said processing apparatus and said processing apparatus is operable to compare said computed position of said user device to a position of said user device determined by said processing apparatus using received surveillance signal.

2. The system of claim 1, wherein said monitoring station is at a known position and said processing apparatus compares said computed position to said known position to check said integrity of said navigation signals.

3. The system of claim 1, wherein each of said satellites has communication switching capabilities so that each of said satellites can route communication signals to a desired recipient.

4. The system of claim 1, wherein said network is formed by each of said satellites directly communicating with at least two other of said satellites so that redundant communication paths exist and each of said satellites is capable of communicating with any other of said satellites either directly or through said network.

5. The system of claim 1, further comprising a plurality of ground stations that are capable of direct two way communication with each satellite within a line of sight, each ground station is capable of two way communication using ground based telecommunication networks, and said network is formed by said ground stations and said satellites.

6. The system of claim 1, wherein said monitoring station is operable to selectively broadcast a surveillance signal and said processing apparatus is operable to compute a position of said monitoring station using said surveillance signal and compare said position of said monitoring station communicated by said monitoring station to said position of said monitoring station computed based upon said surveillance signal to check said integrity of said navigation signals.

7. The system of claim 1, wherein said at least one monitoring station transmits said computed position to said processing apparatus through said at least one of said satellites relaying said computed position to said processing apparatus.

8. A system for monitoring position locating information and providing feedback regarding an integrity of the position locating information, the system comprising:

a plurality of satellites in communication with one another, each of said satellites broadcasting position locating information and having bi-directional communication capability;

at least one monitoring station at a known position and in direct communication with at least one of said satellites for receiving said position locating information.

wherein said monitoring station extrapolates position information from said position locating information, transmits said position information to at least one of said satellites and a processing apparatus, and said processing apparatus uses said transmitted position information and said known position of said at least one monitoring station to verify an integrity of said position locating information being broadcast by said satellites, and wherein said monitoring station is operable to selectively broadcast a surveillance signal and said processing apparatus is operable to compute a position of said monitoring station using said surveillance signal and compare said position of said monitoring station communicated by said monitoring station to said position of said monitoring station computed based upon said surveillance signal to check said integrity of said navigation signals.

9. The system of claim 8, further comprising a user segment having at least one user device in direct communication with at least one of said satellites for receiving said position locating information, wherein said user device extrapolates position information from said position locating information, transmits said position information for said user device to said processing apparatus, and said processing apparatus uses said position information for said user device to maintain an integrity of said position locating information being broadcast by said satellites.

10. The system of claim 9, wherein said user device broadcasts surveillance information to at least one of said satellites and said processing apparatus uses said surveillance information to maintain an integrity of said position locating information being broadcast by said satellites.

11. The system of claim 8, wherein said processing apparatus and said monitoring station are part of a terrestrial segment.

12. The system of claim 8, wherein said monitoring station transmits said position information to said processing apparatus through said at lest one of said satellites relaying said position information to said processing apparatus.

13. A method of checking an integrity of an integrated communication and navigation system, the method comprising:

(a) broadcasting navigation signals from a plurality of satellites in communication with one another;

(b) computing a position of a monitoring station based upon said navigation signals received by said monitoring station;

(c) reporting said computed position to a processing apparatus via a communication signal sent to said satellites;

(d) broadcasting a surveillance signal from the monitoring station:

(e) computing a position of said monitoring station based upon said surveillance signal: and (f) ascertaining an integrity of said navigation signals with said processing apparatus based upon a comparison of said computed position using said navigation signals and a known position of said monitoring station and a comparison of said computed position of said monitoring station based upon said navigation signals and said surveillance signal.

14. The method of claim 13, further comprising reporting said computed position in response to being polled.

15. The method of claim 13, further comprising reporting said computed position at predetermined intervals.

* * * * *